United States Patent

Funaya

[19]

[11] Patent Number: 5,924,546
[45] Date of Patent: *Jul. 20, 1999

[54] PARTS ORIENTATION FEEDING APPARATUS

[75] Inventor: Kazuhiro Funaya, Toyama-ken, Japan

[73] Assignee: YKK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,867

[22] Filed: Dec. 19, 1996

[30] Foreign Application Priority Data

Dec. 25, 1995 [JP] Japan .................................. 7-336872

[51] Int. Cl.$^6$ ........................... B65G 43/08; B65G 47/26
[52] U.S. Cl. .................... 198/395; 198/459.7; 198/460.1
[58] Field of Search .............................. 198/459.7, 460.1, 198/395, 398

[56] References Cited

U.S. PATENT DOCUMENTS

| | | | |
|---|---|---|---|
| 3,282,397 | 11/1966 | Grunwald | 198/395 |
| 3,506,840 | 4/1970 | Fink | 198/398 |
| 4,120,393 | 10/1978 | Motooka et al. | 198/459.7 |
| 4,261,456 | 4/1981 | Scarpa et al. | 198/460.1 |
| 4,333,558 | 6/1982 | Nonaka et al. | 198/395 |
| 4,655,350 | 4/1987 | Mojden et al. | 198/398 |
| 4,819,784 | 4/1989 | Sticht | 198/395 |
| 4,995,503 | 2/1991 | Graham et al. | 198/395 |
| 5,082,103 | 1/1992 | Ross et al. | 198/460 |
| 5,311,977 | 5/1994 | Dean et al. | 198/395 |
| 5,582,283 | 12/1996 | Arnarson | 198/463.3 |

*Primary Examiner*—William E. Terrell
*Assistant Examiner*—Patrick Mackey
*Attorney, Agent, or Firm*—Hill & Simpson

[57] ABSTRACT

A parts orientation feeding apparatus has a first conveyor and a second conveyor disposed in alignment on a parts feed path. A transfer mechanism is provided for transferring the parts from the first conveyor to the second conveyor. A parts orientation detector detects the orientation of each of the parts on the second conveyor. A control unit receives parts on the second conveyor. A control unit receives a parts orientation signal from the orientation detector and determines whether any of the parts are of an undesirable orientation. A parts remover responds to a command from the control unit and removes the parts having the undesired orientation. The plurality of parts detectors are disposed along the parts feed path downstream of the parts remover for detecting the parts and sending a detection signal to the control unit. A plurality of opening and shutting mechanisms are disposed successively one each at a downstream side of a corresponding one of the parts detectors. Each of the opening and shutting mechanisms is for opening and shutting a corresponding portion of the parts feed path in succession based upon a control unit signal at a result of a detection signal. The mechanisms are open and shut to accommodate for the removed parts of the undesired orientation and to provide downstream uniform part distribution along the parts feed path.

5 Claims, 6 Drawing Sheets

PARTS ORIENTATION FEEDING APPARATUS

BACKGROUND OF THE INVENTION

1. Field of the Invention

The present invention relates to a parts orientation feeding apparatus for feeding, among from a great multiplicity of parts or articles supplied successively in various orientations from the preceding processing station, only parts or articles having a predetermined orientation to the next processing station at a predetermined timing while keeping their orientation.

2. Description of the Prior Art

As disclosed in Japanese Patent Laid-open Publication No. SHO 59-182112, for example, a known parts feeding apparatus used for feeding various parts of irregular profiles or cross sections to an assembling station includes a belt conveyor disposed in a feed path along which a large number of parts heaped disorderly in the bowl of a parts feeder are conveyed by vibration. The parts, as they are positively fed on the belt conveyor, are observed by a television camera. Two-dimensional image information picked up by the television camera for each part is compared to reference image information which is previously memorized in a memory device so that only the parts having a desired orientation are transferred to the next processing station by a means such as a robot, while the parts having undesired orientations are further advanced along the belt conveyor.

The known parts feeding apparatus, however, has a drawback that the parts having the desired orientation to be selected for transportation to the next processing station appear in random order during conveyance on the belt conveyor disposed within the bowl in the vibratory-type parts feeder, so that transportation of the selected parts to the next processing station and the operation of the next processing station cannot be performed at a proper timing, resulting in an oversupply or a shortage of parts at the next processing station.

SUMMARY OF THE INVENTION

With the foregoing drawback of the prior art in view, it is an object of the present invention to provide a parts orientation feeding apparatus which is capable of removing parts of undesired orientations selected among from parts delivered in various orientations from a parts supply means, and feeding only parts of a desired orientation to the next processing station in synchronism with operation performed at the next processing station.

To attain the foregoing object, there is provided, according to the present invention, a parts orientation feeding apparatus for receiving a great multiplicity of parts including those having undesired orientations supplied in succession from a preceding processing station, and for feeding only parts having a desired orientation to the next processing station after the parts of the undesired orientations are detected and removed, wherein the improvement comprises: a first conveying means and a second conveying means disposed in alignment on a parts feed path; parts orientation detecting means for detecting an orientation of each of the parts as it is transferred from the first conveying means to the second conveying means: a control unit including a discriminating circuit for judging any of the parts to be one having an undesired orientation when it receives a parts orientation signal from the parts orientation detecting means; parts removing means disposed on the parts feed path at an upstream end of the second conveying means and operative in response to a command from the control unit to remove the parts of the undesired orientations; a plurality of parts detecting means disposed in a row along the parts feed path on a downstream side of the parts removing means, each serving to detect the presence of any parts and sending a detection signal to the control unit; and a plurality of parts-feed-path opening and shutting means disposed at a downstream side of and adjacent to the parts detecting means, respectively, for opening and shutting corresponding portions of the parts feed path in succession when they receive a signal from the control unit based on the result of the detection by the parts detecting means.

According to preferred embodiments of the present invention, the parts orientation detecting means comprises a television camera and a laser beam emitting device, used either alone or in combination.

The parts orientation feeding apparatus of the foregoing construction operates as follows.

Parts fed in various orientations from the preceding operating station are delivered in succession to the first conveyor means (belt conveyor, for example). In this instance, since each of the parts is forced to advance forward by a subsequent one, there is a speed difference between movement of the preceding one and movement of the subsequent one, making a certain space between the adjacent parts on the first belt conveyor. The parts on the first belt conveyor are not uniform in orientation in terms of the sides (obverse and reverse) and ends (fore and rear) of the parts. The parts of different orientations are then transferred in succession from the first belt conveyor to the second conveyor means (belt conveyor, for example).

While the parts are conveyed either by the first belt conveyor or by the second belt conveyor, each orientation of the parts is detected by the parts orientation detecting means. A detection signal sent from the parts orientation detecting means is digitized and then compared to reference data about orientation, such as the sides (obverse and reverse) and ends (fore and rear) of the parts which have previously been memorized in the control unit. If the detected real-value data deviate from the reference data, it is judged to be one having an undesired orientation, and after the lapse of a predetermined time period set in accordance with a speed of conveyance of the parts by the second belt conveyor, the parts removing means is driven to remove the one of the undesired orientation from the second belt conveyor.

Since the parts of the undesired orientations are removed in the manner described above, the parts fed in succession on the second belt conveyor have a predetermined uniform orientation in terms of the sides (obverse and reverse ) and the ends (fore and rear) of the parts. The parts are then detected in sequence by two or more parts detecting means or detectors disposed adjacent to corresponding opening and shutting means or stoppers, respectively, so that the parts of the desired orientation are reliably fed in succession to the downstream end of the second belt conveyor in synchronism with a processing operation performed at the next processing station. The detectors and the opening and shutting stoppers jointly perform a multi-stage parts conveyance control operation in a manner described below.

In a condition in which no part is present at the position of each opening and shutting stopper, the control unit sends a drive signal to the opening and shutting stopper which is located just upstream of the detector if the detector disposed at the downstream end of the parts feed path detects the absence of any of the parts, whereupon the opening and shutting stopper is driven to open the parts feed path. In this instance, however, due to the absence of any of the parts at the position of the opening and shutting stopper, no parts are conveyed to the downstream side of the same opening and shutting stopper. At the same time, the detector or detectors located upstream of the first-mentioned detector detect the absence of any parts, the control unit sends a drive signal to each of the opening and shutting stoppers disposed upstream of the first-mentioned stopper to cause the stoppers to open the corresponding portions of the parts feed path successively. Thus, in the condition where no parts are present at the position of each of the opening and shutting stoppers, all the stoppers assume their open positions so that the parts feed path is fully opened.

Under such condition, each of the parts having a desired orientation is fed on the second belt conveyor and subsequently arrives at the downstream end of the second belt conveyor where further advancing movement of the one is stopped by the stopper at the downstream end. In this instance, the presence of the one at the position of the endmost stopper is detected by the corresponding detector, which sends a detection signal to the control unit. Upon receipt of the detection signal, the control unit operates the opening ad shutting stopper located just upstream of the detector to close a corresponding portion of the parts feed path. At the same time, the control unit operates a parts gripping device or gripper for transferring the one from the downstream end of the parts feed path to the next processing station at a proper timing. During that time, when succeeding parts approach the respective stoppers, the individual parts are detected respectively by the detectors disposed upstream of the corresponding opening and shutting stoppers. Upon detection, the opening and shutting stoppers, under the control of the control unit, successively close the parts feed path in succession from the downstream side toward the upstream side of the parts feed path. With this operation, each of the parts of the desired orientation is arrested at the positions of each of the opening and shutting stoppers.

The parts are held in the arrested condition at the position of the respective opening and shutting stoppers until the leading one arrested at the downstream end of the parts feed path is discharged by the parts gripper. When the leading one is discharged by the parts gripper, the corresponding detector detects the absence of any parts, whereupon the opening and shutting stoppers are operated to open the feed path, allowing each of the parts to be advanced by one step toward the downstream side.

The above and other objects, features and advantages of the present invention will become manifest to those versed in the art upon making reference to the detailed description and accompanying sheets of drawings in which preferred structural embodiments incorporating the principles of the present invention are shown by way of illustrative example.

DETAILED DESCRIPTION OF THE PREFERRED EMBODIMENTS

Figure 1:
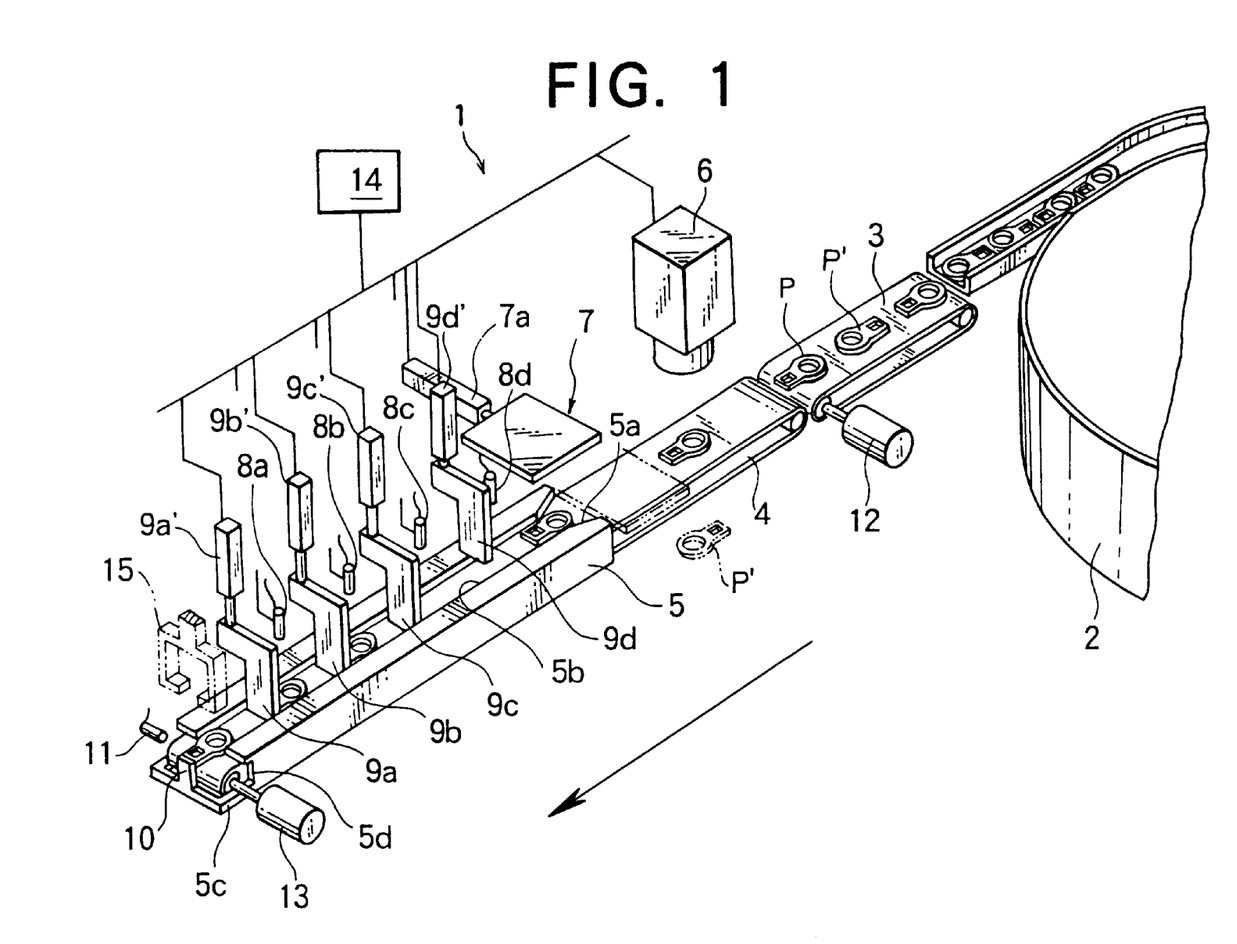
FIG. 1 is a schematic perspective view showing the general construction of a main portion of an orientation feeding apparatus for feeding pull tabs for slide fasteners according to a typical embodiment of the present invention.
Figure 2:
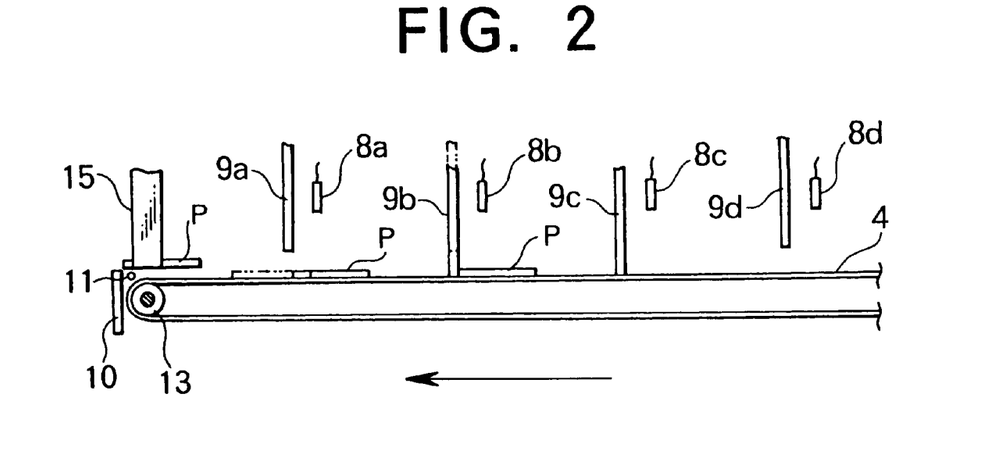
FIG. 2 is a longitudinal cross-sectional view illustrative of the operation of multistage opening and shutting stoppers disposed in series along a second belt conveyor of the pull-tab orientation feeding apparatus.

Certain preferred embodiments of the present invention will be described below in greater detail with reference to the accompanying drawings. FIG. 1 is a schematic perspective view showing the general construction of a parts orientation feeding apparatus according to an embodiment of the present invention. In the illustrated embodiment, the apparatus is so constructed as to feed pull tabs P to be attached to the slider bodies of sliders of slide fasteners. The invention should by no means be restricted in application to the illustrated pull-tab orientation feeding apparatus.

In the illustrated embodiment, the pull-tab orientation feeding apparatus 1 comprises a first belt conveyor 3 disposed adjacent to a pull-tab discharge end of a parts feeder 2, a second belt conveyor 4 disposed in connection with the first belt conveyor 3, a guide member 5 for guiding pull tabs P while holding the posture of the pull tabs P being conveyed along a downstream part of the second belt conveyor 4, a television camera 6 disposed above an upstream end of the second belt conveyor 4 and serving as a parts orientation detecting means, a pull-tab removing means 7 movable back and forth transversely across a longitudinal feed path of the second belt conveyor 4 at a position adjacent to a parts inlet 5a of the guide member 5, first through fourth pull-tab detectors 8a–8d disposed at predetermined intervals toward and along the feed path for detecting the presence of each pull tab P being guided by the guide member 5, first through fourth opening and shutting stoppers 9a–9d disposed adjacent to the first through fourth pull tab detectors 8a–8d, respectively, at the downstream side of thereof, a pull-tab stopping portion 10 disposed adjacent to, and in front of a downstream end of the second belt conveyor 4, and another pull-tab detecting 11 disposed on one side of the downstream end of the second belt conveyor 4.

The first and second belt conveyors 3 and 4 are driven by a first electric motor 12 and a second electric motor 13, respectively, so that they can rotate in the same direction at the same speed or different speeds. In the illustrated embodiment, the second belt conveyor 4 is controlled so as to rotate at a higher speed than the first belt conveyor 3. The pull tabs P supplied end in contact with one another and in random orientations from the parts feeder 2 are slightly spaced from one another as they are delivered to the first belt conveyor 3. The space between the adjacent pull tabs P is further enlarged when the pull tabs P are transferred from the first belt conveyor 3 to the second belt conveyor 4 because the second belt conveyor 4 is driven at a higher speed than the first belt conveyor 3 as previously described. The thus enlarged space between the adjacent pull tabs P facilitates handling of the pull tabs P in subsequent processing operations.

The television camera 6 is connected to a central control unit 14 such that image information taken by the camera 6 for each pull tab P is digitized and then compared to reference pattern information which is previously memorized in the central control unit 14. If the image information does not match with the reference pattern information, the central control unit 14 judges the pull tab P to be a pull tab P' having an undesired orientation, and after the lapse of a predetermined time preset on the basis of a speed of conveyance of the pull tabs P by the second belt conveyor 4, a signal indicative of the pull tab P' of the undesired orientation is sent from the central processing unit 14 to an actuator 7a of the pull-tab removing member 7 whereupon the pull-tab removing member 7 is moved transversely across the feed path of the second belt conveyor 4 to remove the pull tab P' from the second belt conveyor 4. Though not shown, a return conveyor is disposed below the second belt conveyor 4 for receiving the pull tabs P' dropped from the second belt conveyor 4 and returning them to the parts feeder 2. According to the illustrated embodiment, the pull tab removing member 7 is formed of a rectangular plate, and the actuating member 7a is an air cylinder.

Figure 3:
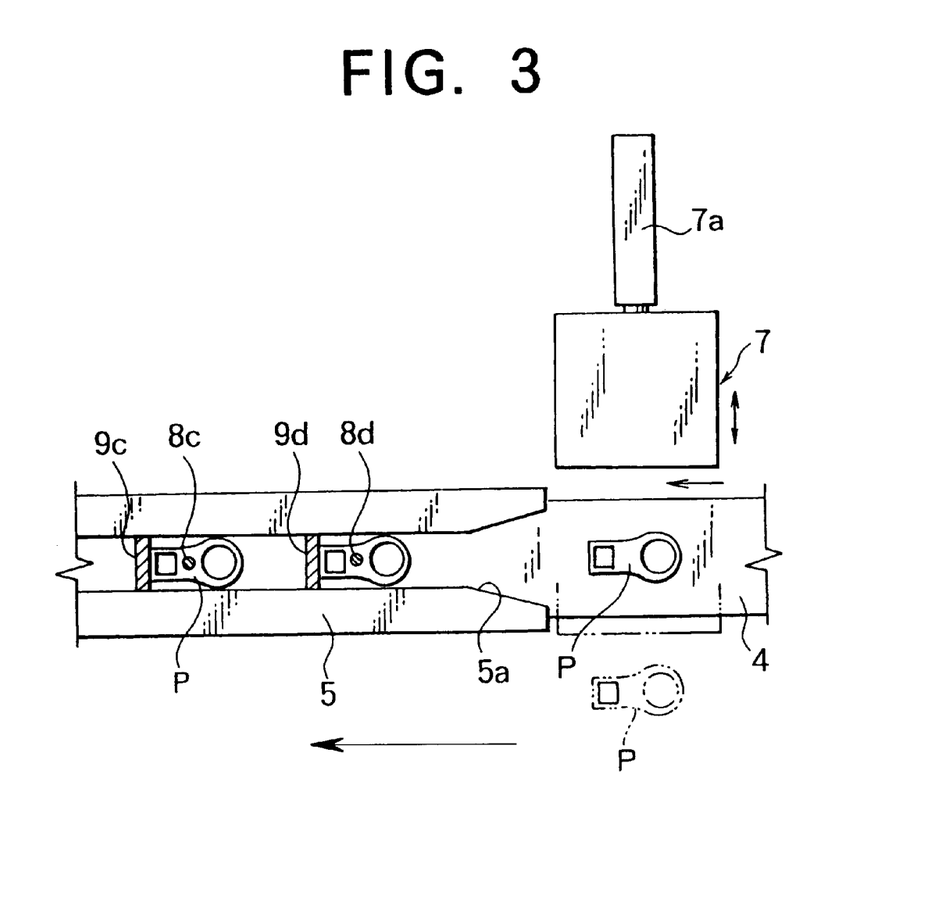
FIG. 3 is a fragmentary plan view showing the operation of a mechanism disposed on a side of the second belt conveyor for removing parts of undesired orientations.

The guide member 5 disposed longitudinally along the downstream half of the second belt conveyor 4 is in the form of an elongated channel having a substantially C-shaped cross section. The rectangular tube-like guide member 5 has in its upper side a longitudinal slit-like opening 5b, and the pull tab inlet 5a provided at an upstream end of the guide member 5 has a substantially V-shape flaring toward the first belt conveyor 3 and communicate with the slit-like opening 5b at its reduced end, as shown in FIG. 3. The slit-like opening 5b has a width substantially equal to, or preferably slightly greater than, a maximum width of each of the pull tabs P. The downstream end of the guide member 5 is cut out except a bottom wall 5c so as to form a cut-out portion 5d, and a vertical pull-tab stopper 10 projecting upwardly from a central portion of the downstream end edge of the bottom wall 5c. The pull-tab detector 11 is disposed on one side of the cut-out portion 5d of the guide member 5 and directed toward a downstream end of the feed path of the second belt conveyor 4. The pull-tab detector 11 comprises a reflection type photosensor having built-in light projector and light interceptor. The pull-tab detector 11 may be of an electrical type or a mechanical type sensor.

The first through fourth pull-tab detectors 8a–8d disposed adjacent to the corresponding one of the opening and shutting stoppers 9a–9d are also reflection type photosensors each having built-in light projector and light interceptor as a single built-in unit. The pull tab detectors 8a–8d are connected to the central control unit 14. As shown in FIG. 1, each of the opening and shutting stoppers 9a–9d comprises a generally inverted L-shaped plate having one end (lower end) transversely slidably receivable in the slit-like opening 5b of the guide member 5, and the other end (upper end) connected to a corresponding one of four air cylinders 9a'–9d' which are firmly attached to a frame (not shown) of the apparatus for vertically reciprocating the opening and shutting stoppers 9a–9d toward and away from the slit-like opening 5b. The air cylinders 9a'–9d' are also connected to the central control unit 14. As indicated by the phantom lines shown in FIG. 1, there is provided a pull-tab gripper 15 reciprocally movable between the downstream end of the second belt conveyor 4 and the next processing station.

The pull-tab orientation feeding apparatus of the foregoing construction operate as follows.

Pull tabs P are successively fed in contacted condition from the parts feeder 2. In this instance, since a feed path of each of the parts feeder 2 has a width substantially equal to the width of the pull tabs P, the pull tabs P are oriented or aligned in the longitudinal direction and be in contact with one another, so that each of the pull tabs P is being forced forwardly at an outlet of the parts feeder 2 by the subsequent pull tab P. The pull tab P is then delivered from the parts feeder 2 to the first belt conveyor 3, in which instance since the pull tab P is forced forwardly by the subsequent pull tab P, there is a speed difference between conveyance of the pull tab P and conveyance of the next following pull tab P. By virtue of this speed difference, the adjacent pull tabs P which have been delivered to the first belt conveyor 3 are spaced from one another at certain distances.

The pull tabs P while being fed by the first belt conveyor 3 do not have a uniform orientation in terms of sides (obverse and reverse) and ends (fore and rear). The pull tabs P having different orientations arranged at random are then transferred in succession from the first belt conveyor 3 to the second belt conveyor 4. In this instance, since the speed of conveyance of the pull tabs P by the second belt conveyor 4 is higher than the speed of conveyance of the pull tabs P by the first belt conveyor 3, the pull tabs P while being conveyed by the second belt conveyor 4 are spaced by a greater distance than the pull tabs P carried on the first belt conveyors 3. There are some cases in which the pull tab conveyance speed of the second belt conveyor 4 needs not be higher than that of the first belt conveyor 3. In such cases, the first and second belt conveyors 3, 4 are driven at the same conveyance speed.

In the illustrated embodiment, the pull tabs P which have been transferred to the second belt conveyor 4 are observed from above by the television camera 6. Image information taken by the television camera 6 for each of the observed pull tabs P is digitized and then compared to reference image data about orientations of pull tabs P in terms of sides (obverse and reverse) and ends (fore and rear) thereof, which are previously memorized in a comparator of the central control unit 14. If the observed image information does not match with, or deviates from, the reference image data, the observed pull tab P is judged to be a pull tab P' having an undesired orientation, and after the lapse of a predetermined time which is set in view of the pull tab conveyance speed of the second belt conveyor 4, the central control unit 14 sends a signal to the actuator 7a whereupon the pull-tab removing member 7 is advanced transversely across an upper surface of the second belt conveyor 4, thereby removing the pull tab P' of the undesired orientation from the second belt conveyor 4. To this end, the central control unit 14 includes a non-illustrated timer which starts to count time when the image information is input into the central control unit 14. The image taken by the television camera 6 may be displayed on a display monitor for visual observation of the pull tabs P.

Since the pull tabs P' having undesired orientations can be removed in the manner described above, the pull tabs P fed in succession on the second belt conveyor 4 have a predetermined uniform orientation in terms of the sides (obverse and reverse ) thereof and the ends (fore and rear) of the pull tabs P. The pull tabs P are then detected in sequence by the first through fourth pull tab detectors 8a–8d disposed adjacent to the first through fourth opening and shutting stoppers 9a–9d, respectively, so that the pull tabs P of the desired orientation are reliably fed in succession to the downstream end of the second belt conveyor 4 in synchronism with a processing operation performed at the next processing station.

Figure 4:
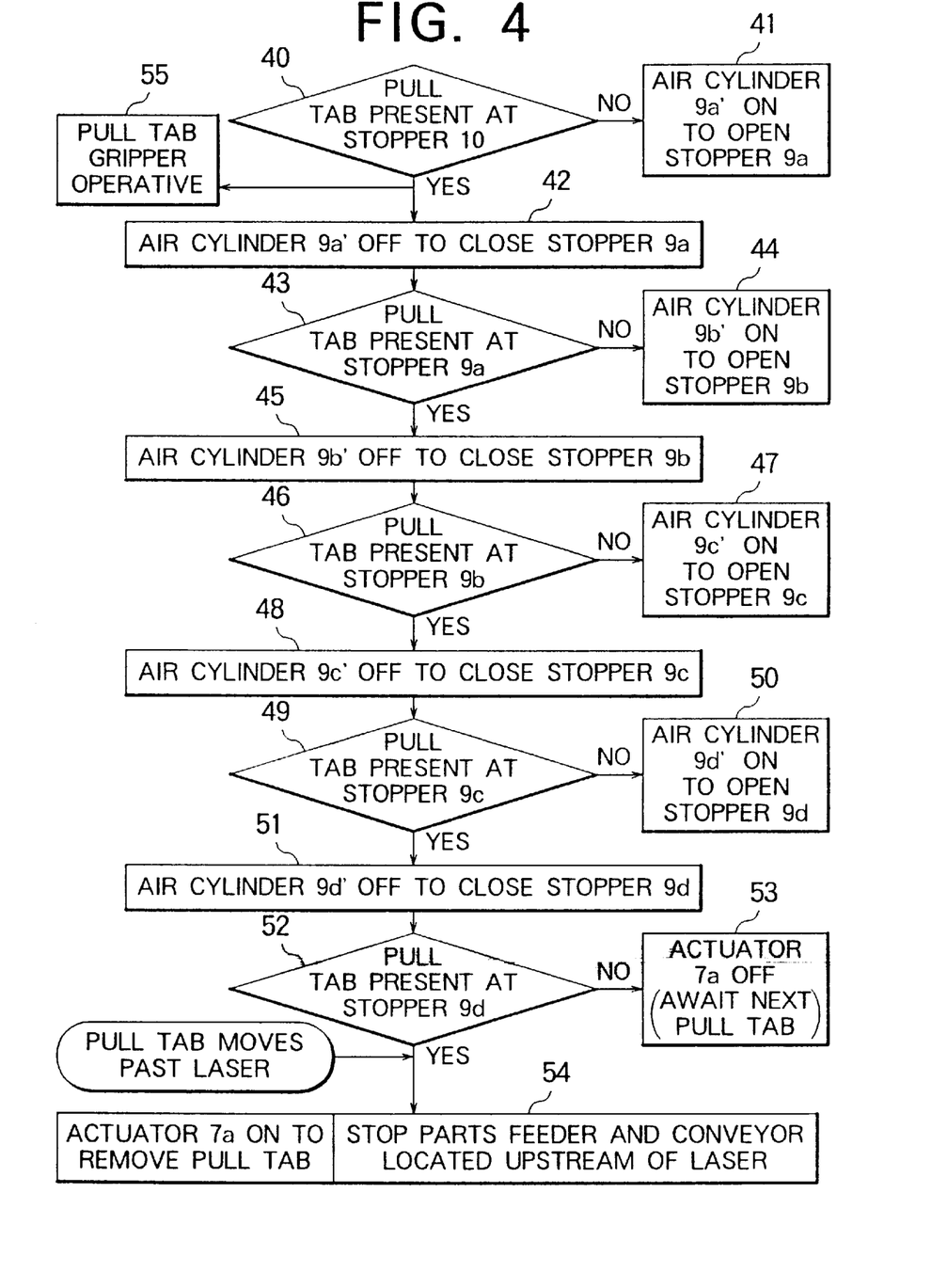
FIG. 4 is a flowchart showing a sequence of operations performed to control the operation of the opening and shutting stoppers.

FIG. 4 is a flowchart showing a sequence of operations of the first through fourth pull-tab detectors 8a–8d, the pull-tab detector 11 at the downstream end of the second belt conveyor 4, and the first through fourth opening and shutting stoppers 9a–9d that cooperate in controlling conveyance of the pull tabs P. The flowchart explains operation in which there is no pull tab P located at the position of each opening and shutting stopper 9a–9d at initial positions and the upright pull-tab stopper 10 at the downstream end of the guide member 5.

The pull-tab detector 11 detects the absence of a pull tab P at the pull-tab stopper 10 (step 40). In response to this detection, the central control unit 14 sends a drive signal to the air cylinder 9a' of the first opening and shutting stopper 9a whereupon the first opening and shutting stopper 9a is retracted upwardly away from the slot-like opening 5b in the guide member 5 so as to open the pull-tab feed path (step 41). In this instance, however, due to the absence of the pull tab P at the position of the first opening and shutting stopper 9a, no pull tab P is conveyed to the downstream side of the first opening and shutting stopper 9a. At the same time, the first, second, third and fourth pull-tab detectors 8a–8d detect the absence of the pull tabs P at each position of the corresponding one of the opening and shutting stoppers 9a–9d and send electric signals indicative of the absence of the pull tabs P to the central control unit 14 (steps 43, 46, 49 and 52) which operates to retract the second, third and fourth opening and shutting stoppers 9b, 9c, 9d upwardly in succession, thereby opening the corresponding portions of the pull-tab feed path (steps 44, 47 and 50). When no pull tab P is present at the position of each of the first through fourth opening and shutting stoppers 9a–9d and the pull-tab stopper 10, all the stoppers 9a–9d are retracted upwardly and fully open the pull-tab feed path.

Then, a pull tab P having a desired orientation is fed on the second belt conveyor 4 and subsequently arrives at the downstream end of the second belt conveyor 4 where advancing movement of the pull tab P is stopped by the pull-tab stopper 10. In this instance, the presence of the pull tab P at the position of the pull-tab stopper 10 is detected by the pull-tab detector 11 which in turn sends a detection signal to the central control unit 14 (step 40). Upon receipt of the detection signal, the central control unit 14 operates the air cylinder 9a' to return the first opening and shutting stopper 9a to its downward initial position, thereby closing a portion of the pull-tab feed path located at the position of the first opening and shutting stopper 9a (step 42). At the same time, the central control unit 14 operates the pull-tab gripper 15 in synchronism with the processing operation performed at the next processing station (step 55). During that time, when the subsequent pull tab P of the desired orientation reach the position of the first opening and shutting stopper 9a, the presence of this pull tab P is detected by the first pull-tab detector 8a (step 43), and in response to this detection, the central control unit 14 drives the air cylinder 9b' to lower the second opening and shutting stopper 9b to its downward original position, thereby closing a portion of the pull-tab feed path corresponding to the position of the second opening and shutting stopper 9b (step 45). The same operation and control are performed with respect to the third and fourth opening and shutting stoppers 9c and 9d, with the result that one pull tab P of the desired orientation is arrested at the position of each of the first through fourth opening and shutting stoppers 9a–9d (steps 46, 48, 49 and 51).

The pull tabs P are held in the standby condition at the position of the respective opening and shutting stoppers 9a–9d until the pull tab P arrested at the pull-tab stopper 10 is discharged by the pull-tab gripper 15. After the pull tab P arrested at the pull-tab stopper 10 is discharged by the pull-tab gripper 15 (step 55), the pull-tab detector 11 detects the absence of the pull tab P at the position of the pull-tab stopper 10 (step 40), whereupon the first through fourth opening and shutting stoppers 9a–9d move upwardly, under the control of the central control unit 14, to open the pull-tab feed path in the same sequence of operations as described above, whereby allowing the succeeding pull tabs P to be advanced by one step (corresponding to the distance between the adjacent stoppers 9a–9d) toward the downstream side.

When the pull tab P is standing by at the position of the fourth opening and shutting stopper 9d, the presence of the pull tab P is detected by the fourth pull-tab detector 8d and a detection signal is sent to the central control unit 14 (step 52). Upon receipt of the signal, the central control unit 14 sends a signal to the actuator 7a to operate the pull-tab removing member 7 such that any forthcoming pull tab P, P' is removed from the second belt conveyor 4 as indicated by the phantom lines shown in FIGS. 1 and 3, regardless of whether the pull tab P, P' has the desired orientation or not (step 54). In the absence of a pull tab P at the position of the fourth pull-tab detector 8d, the actuator 7a is kept in inoperative condition (step 53).

According to the illustrated embodiment described above, the pull tabs P of the desired orientation can be fed on the second belt conveyor 4, at regular intervals, in proper quantities and at a desired timing, to a predetermined position at the downstream end of the second belt conveyor 4.

It is apparent from the foregoing description that the opening and shutting stoppers located at four distinct positions should by no means be essential to the present invention. However, in order to secure synchronous delivery of the parts to the next processing station, the opening and shutting stopper and the associated pull-tab detector of the apparatus are located at at least two distinct positions.

Figure 5:
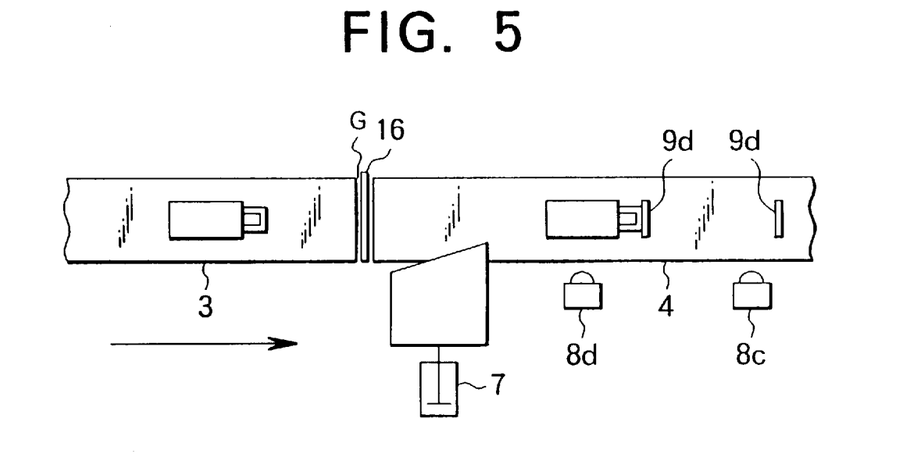
FIG. 5 is a fragmentary plan view showing a modification of a pull-tab orientation detecting means shown in the foregoing embodiment.

FIG. 5 illustrates a modified form of the invention in which a laser oscillator 16 is used as the parts orientation detecting means in place of the television camera 6 in the first embodiment previously described. In this embodiment, the first belt conveyor 3 and the second belt conveyor 4 are longitudinally spaced by a gap G for the passage therethrough of a laser beam of a desired luminous energy (quantity of light) which is emitted from above from the laser oscillator 16 via a non-illustrated optical system by means of which light beam emitted from the laser oscillator 16 is converted or modified into a strip-like form. The luminous energy of the laser beam is set on condition that a maximum output power of the laser oscillator 16 is 30 watts (W). A non-illustrated light interceptor is disposed directly below the gap G for receiving the light beam emitted from the laser oscillator 16. The light interceptor converts incident luminous energy into an electric voltage value via a non-illustrated amplifier. The voltage value is sent to the central control unit 14, which digitizes the voltage value and computes a voltage value (real value) at the end of each of the preset time periods. The real values obtained by the computation are compared in succession to reference values that are previously memorized in the comparator for the corresponding time periods. In this instance, if any of the computed real value deviates from the corresponding reference value, an NG signal at a high (Hi) level or a low (Lo) level is sent to the actuator 7a of the pull-tab removing member 7.

Figures 6A, 6B:
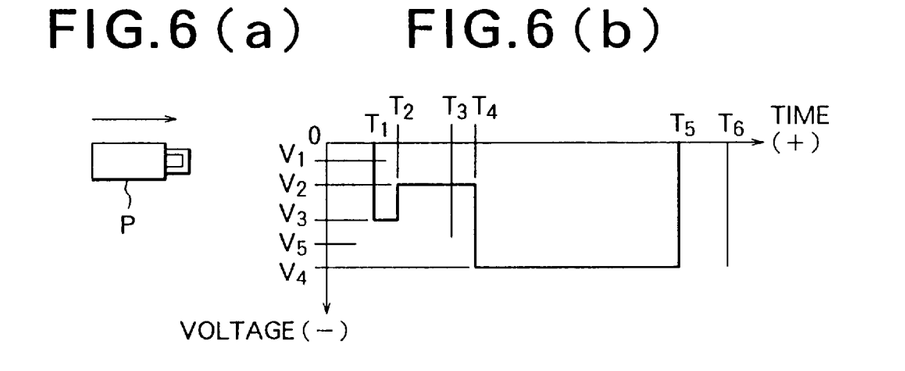
FIG. 6 is an explanatory view showing changes in electric voltage observed when a pull tab of a desired orientation moves across a laser beam emitted from the modified pull-tab orientation detecting means.
Figures 7A, 7B:
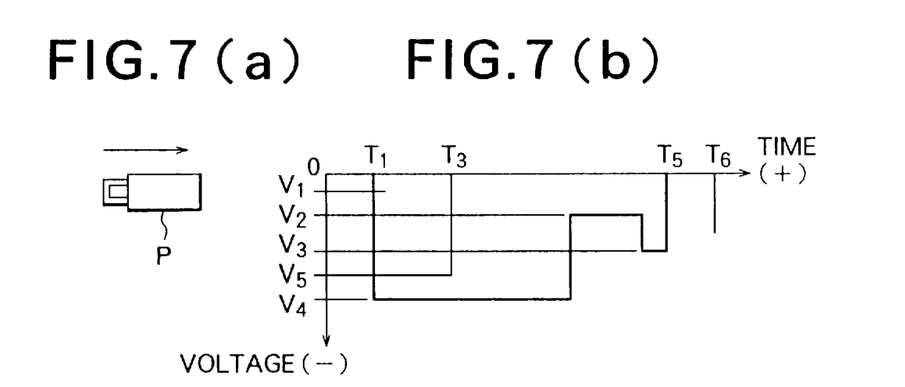
FIG. 7 is an explanatory view showing changes in electric voltage observed when a pull tab of an undesired orientation moves across the laser beam.
Figures 8A, 8B:
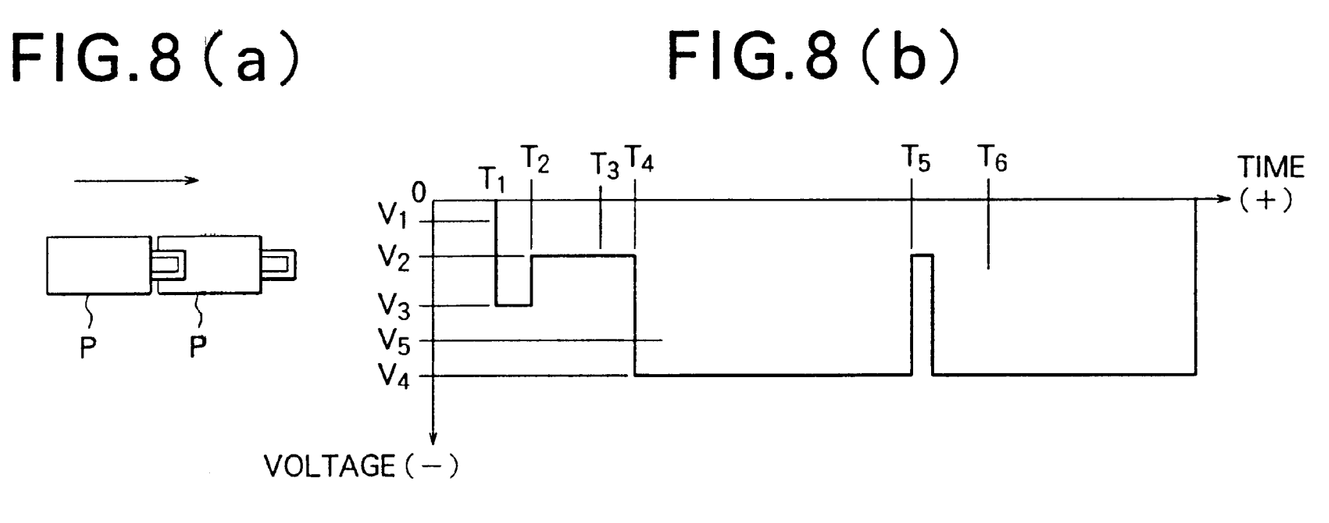
FIG. 8 is an explanatory view showing changes in electric voltage observed when a pull tab of another undesired orientation moves across the laser beam.

FIGS. 6 through 8 show examples of changes in voltage value as the time runs according to changes in luminous energy (quantity of light) received by the light-sensitive element when a pull tab P, P' is transferred from the first belt conveyor 3 to the second belt conveyor 4. In the case where the pull tab P has a desired orientation as shown in FIG. 6(a), the voltage value converted by the amplifier for the time (T1–T5) changes in a pattern shown in FIG. 6(b). The voltage pattern shown in FIG. 6(b) is a reference voltage pattern. In case where the pull tab P has an undesired orientation shown in FIG. 7(a) which is inverted from the desired orientation so as to orient in a opposite direction, as shown in FIG. 7(a), the voltage value changes as in a pattern shown in FIG. 7(b), which is reverse to the voltage pattern of FIG. 6(b). Further, it may occur that two or more adjacent pull tabs P are fed in overlapping condition from the first belt conveyor 3, such as shown in FIG. 8(a). In this case, the voltage value temporarily increases from V4 to V2 at the end of the time period T5 and, immediately thereafter, it decreases from V2 to V4, as shown in a voltage pattern shown in FIG. 8(b).

Accordingly, in the case of the voltage pattern which changes as the time runs as shown in FIG. 7(b) or FIG. 8(b), the central control unit 14 judges the voltage pattern to be indicative of a pull tab P' having an undesired orientation as a result of comparison with the reference voltage pattern as shown in FIG. 6(b). Based on this judgment, the central control unit 14 sends an NG signal to the actuator 7a of the pull-tab removing member 7 at a time after the lapse of a time period predetermined according to the speed of conveyance of the pull tabs P after the detection. Upon receipt of the NG signal, the actuator 7a is driven to advance the pull-tab removing member 7 transversely across the second belt conveyor 4 so that the pull tab P' of the undesired orientation while being fed on the second belt conveyor 4 is forced to drop from the second belt conveyor 4.

In the embodiment shown in FIG. 5, the laser beam projected to the gap G between the first and second belt conveyors 3, 4 is used alone to detect and remove the pull tabs P' of undesired orientations. However, there is a case where the parts orientation detecting means consisting of only the laser oscillator 16 cannot perform reliable discrimination between the obverse and the reverse sides of pull tabs P. In this case, the laser oscillator 16 is used in combination with a television camera 6, as shown in FIG. 9.

Figure 9:
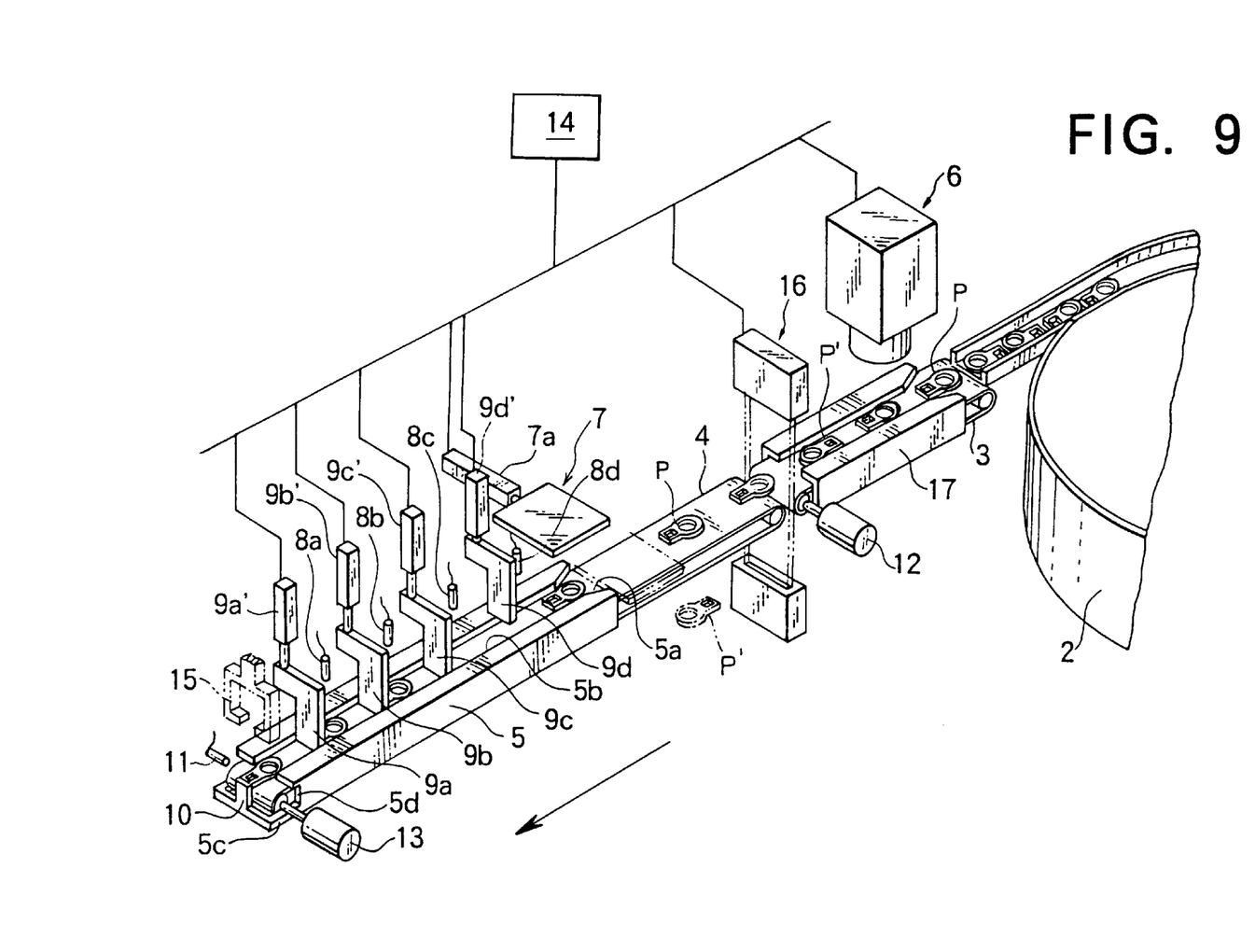
FIG. 9 is a schematic perspective view showing the general construction of a main portion of a pull-tab orientation feeding apparatus according to another embodiment of the present invention.

In an embodiment shown in FIG. 9, the television camera 6 is disposed above the first belt conveyor 3. In addition, a parts guide member 17, which is structurally and functionally the same as the parts guide member 5 which is disposed longitudinally along a parts conveyance surface of the second conveyor 4, as shown in FIG. 1, is disposed longitudinally along a parts conveyance surface of the first belt conveyor 3. By virtue of the parts guide member 17, the pull tabs P can be longitudinally aligned as they are conveyed on the first belt conveyor 3, though the pull tabs P tend to incline to one or the other side as they are delivered from the parts feeder 2 to the first belt conveyor 3.

The pull tabs P while being fed in such longitudinally aligned condition are then observed by the television camera 6. Image information about the sides (obverse or reverse) of each observed pull tab P is sent from the television camera 6 to the central control unit 14 where it is compared with preset reference information to make a judgment as to whether the observed pull tab P is fed with its obverse side faced upwardly or not. Assuming that the pull tabs P with their obverse side faced upwardly are in a correct posture for conveyance, when any pull tab P' fed with its reverse side faced upwardly is observed by the television camera 6, a non-illustrated obverse-reverse judgment part of the central control unit 14 sends a signal indicative of the pull tab P' being in an reversed condition and, thereafter, upon expiration of a predetermined time period, the actuator 7a of the pull-tab removing member 7 is driven to move the pull-tab removing member 7 forwardly across the second belt conveyor 4, thereby removing the pull tab P' fed in the reversed condition from the second belt conveyor 4.

Further, in this embodiment, a laser beam emitted from the laser oscillator 16 passes from above through a gap between the first belt conveyor 3 and the second belt conveyor 4 so as to detect the orientation of ends of each pull tab P in the manner as described above, for the purpose of making a judgment as to whether or not the pull tab P is fed with its fore end directed forwardly. On the basis of this judgment, the pull tabs P' while being fed with their rear end directed forwardly are removed from the second belt conveyor 4 by means of the pull-tab removing member 7.

The television camera 6 and the laser oscillator 16 used in combination to perform the detection of sides (obverse and reverse) and ends (fore and rear) of pull tabs P, respectively, ensure reliable removal of the pull tabs P' of undesired orientations. In the case where pull tabs P to be handled by the apparatus of this invention have any design pattern on only their obverse side, a judgment about the sides (obverse and reverse) of the pull tabs P can be easily performed. Thus, a television camera 6 disposed above the first belt conveyor 3 can perform the judgment about the obverse and reverse sides of the pull tabs P and about the ends of the pull tabs P, simultaneously.

As is apparent from the foregoing description, the present invention is not limited to the pull-tab orientation feed apparatus but may be applied for a parts orientation feed apparatus for various parts and articles.

According to the parts orientation feed apparatus of the present invention, among from a great multiplicity of parts or articles supplied successively in various orientations including inverted orientations, from the preceding processing station, only parts having a predetermined orientation are detected with reliability to ensure that the parts of the predetermined orientation are precisely fed in succession to the next processing station at a predetermined timing while keeping their orientation, while the remaining parts or articles having undesired orientations are automatically removed from a feed path.

Obviously, various minor changes and modifications of the present invention are possible in the light of the above teaching. It is therefore to be understood that within the scope of the appended claims the invention may be practiced otherwise than as specifically described.

What is claimed is:

1. A parts orientation feeding apparatus for receiving a multiplicity of randomly oriented parts including those having undesired orientations supplied in succession from a preceding processing station, for feeding only parts having a desired orientation to a next processing station after the parts of the undesired orientations are detected and removed, wherein the improvement comprises:

a first conveying means and a second conveying means disposed in alignment on a parts feed path, said second conveying means moving at a faster linear speed than said first conveying means;

a transfer means for transferring the parts from said first conveying means to said second conveying means;

parts orientation detecting means for detecting an orientation of each of the parts on said second conveying means;

a control unit including a discriminating circuit for judging any of the parts to be one having an undesired orientation when said control unit receives a parts orientation signal from said parts orientation detecting means;

parts removing means disposed on said parts feed path at an upstream end of said second conveying means and operative in response to a command from said control unit to remove the parts of the undesired orientations;

a plurality of parts detecting means disposed in a row along said parts feed path on a downstream side of said parts removing means, each serving to detect the presence of any parts and sending a detection signal to said control unit;

a plurality of parts feed path opening and shutting means disposed successively one each at a downstream side of and adjacent to a corresponding one of said parts detecting means, respectively, each for opening and shutting a corresponding portion of said parts feed path in succession when receiving a signal from said control unit based on the result of the detection signal by said parts detecting means to eliminate spaces left by the removed parts of the undesired orientation to provide downstream uniform part distribution along said parts feed path, each of said parts feed path opening and shutting means in contact with one of said parts when in a shutting position and maintaining said part in a desired position on said second conveying means; and a guide member positioned along at least a portion of said second conveying means and defining a slit-like parts opening, and wherein each one of said parts feed path opening and shutting means further comprises a stopper movable toward and away from the slit-like opening in said guide member.

2. A parts orientation feeding apparatus according to claim 1, wherein said parts orientation detecting means comprises a television camera.

3. A parts orientation feeding apparatus according to claim 1, wherein said parts orientation detecting means comprises a laser beam emitting device.

4. A parts orientation feeding apparatus according to claim 1, wherein said parts orientation detecting means comprises a television camera and a laser beam emitting device used in combination.

5. A parts orientation feeding apparatus according to claim 1, wherein said parts removing means also removes parts having a desired orientation when said parts carried by said feeding apparatus become congested along said parts feed path.

* * * * *